United States Patent
Liu et al.

(10) Patent No.: US 12,524,246 B2
(45) Date of Patent: Jan. 13, 2026

(54) MULTI-INITIALIZATION IMPLEMENTATION DXE DRIVER LOADING SYSTEM

(71) Applicant: Dell Products L.P., Round Rock, TX (US)

(72) Inventors: Wei Liu, Austin, TX (US); Alberto David Perez Guevara, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 438 days.

(21) Appl. No.: 18/116,930

(22) Filed: Mar. 3, 2023

(65) Prior Publication Data
US 2024/0296053 A1 Sep. 5, 2024

(51) Int. Cl.
*G06F 9/4401* (2018.01)
(52) U.S. Cl.
CPC .................................. *G06F 9/4411* (2013.01)
(58) Field of Classification Search
None
See application file for complete search history.

(56) References Cited

U.S. PATENT DOCUMENTS

| | | | |
|---|---|---|---|
| 2004/0268368 A1* | 12/2004 | Doran | G06F 21/554 719/321 |
| 2015/0074386 A1* | 3/2015 | Huang | G06F 9/4401 713/2 |
| 2016/0180094 A1* | 6/2016 | Dasar | G06F 9/4406 714/36 |
| 2016/0216974 A1* | 7/2016 | Hanebutte | G06F 21/62 |
| 2017/0154185 A1* | 6/2017 | Chaiken | G06F 21/572 |
| 2019/0042754 A1* | 2/2019 | Jreij | G06F 21/575 |
| 2020/0073676 A1* | 3/2020 | Liu | G06F 9/4411 |

* cited by examiner

*Primary Examiner* — Umut Onat
(74) *Attorney, Agent, or Firm* — Joseph Mencher

(57) ABSTRACT

A multi-initialization implementation DXE driver loading system includes a chassis housing an initialization subsystem coupled to a memory system and a storage system. The storage system stores first DXE driver(s) required for a first initialization implementation but not a second initialization implementation and each including a dummy protocol identifier identifying a dummy protocol in its dependency section, and second DXE driver(s) required for both the first and second initialization implementations and each not including the dummy protocol identifier in its dependency section. If the second initialization implementation is enabled, the initialization subsystem does not provide the dummy protocol in the memory system, which prevents it from providing the first DXE driver(s) in the memory system due to a dependency requirement provided by the dummy protocol identifier in their dependency sections not being satisfied, while providing the second DXE driver(s) in the memory system for use in performing an initialization process.

20 Claims, 8 Drawing Sheets

MULTI-INITIALIZATION IMPLEMENTATION DXE DRIVER LOADING SYSTEM

BACKGROUND

The present disclosure relates generally to information handling systems, and more particularly to loading Driver execution Environment (DXE) drivers to perform an initialization process for information handling systems that are configured to initialize using different initialization implementations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, networking devices, storage systems, desktop computing devices, laptop/notebook computing devices, tablet computing devices, mobile phones, and/or other computing devices known in the art, perform an initialization process in order to load an operating system that allows the computing device to be utilized during runtime. For example, many computing devices perform a Unified Extensible Firmware Interface (UEFI) initialization process (e.g., a "UEFI boot") including three phases: a SECurity (SEC) phase that provides for execution of the Central Processing Unit (CPU) initialization code (e.g., from the cold boot entry point) that sets up the computing device to find, validate, and run a Pre-EFI Initialization (PEI) phase in the UEFI initialization process, with the PEI phase providing for the configuration of the computing device and the loading and booting of a Driver execution environment (DXE) phase in the UEFI initialization process, and with the DXE phase providing for the loading of DXE drivers that are used to configure hardware devices in the computing device, and in some cases to mount storage devices, find/execute boot code, and/or perform other DXE driver operations known in the art. Furthermore, as will be appreciated by one of skill in the art in possession of the present disclosure, following the transfer of control of the computing device to the operating system, a "DXERuntime" remains resident in the computing device to handle any calls from the operating system to the UEFI.

However, some computing devices may be configured to initialize using different initialization implementations. For example, a computing device manufacturer may manufacture computing devices that are configured to initialize using a "standard" initialization implementation (e.g., a UEFI implementation that performs the UEFI initialization process discussed above), but may also allow those computing devices to be configured with a "non-standard" initialization implementation (e.g., a non-UEFI implementation such as a "LINUXBOOT®" implementation). As will be appreciated by one of skill in the art in possession of the present disclosure, "non-standard" initialization implementations like the "LINUXBOOT®" implementation discussed above may replace many of the DXE drivers that are loaded in the DXE phase of the UEFI initialization process performed in the UEFI implementation discussed above with the Linux kernel. However, computing devices configured to initialize using either of the UEFI implementation or "LINUX-BOOT®" implementation discussed above conventionally operate to configure themselves with the "LINUXBOOT®" implementation by using the UEFI implementation to load a "LINUXBOOT®" image that is stored in a Serial Peripheral Interface (SPI) storage system, and thus operate to load all of the DXE drivers required for that UEFI implementation. As such, enhanced security, initialization time reductions, and/or other benefits of the "LINUXBOOT®" implementation that could result from the limited loading of a subset of the DXE drivers available in such "dual initialization implementation" computing devices are reduced.

Accordingly, it would be desirable to provide a dual initialization implementation computing device that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an initialization engine that is configured to: begin an initialization process; determine whether a first initialization implementation or a second initialization implementation is enabled; and if the second initialization implementation is enabled: not provide a dummy protocol in the memory system; not provide a first subset of DXE drivers, which are required for the first initialization implementation but not required for the second initialization implementation, in a memory system based on the lack of the dummy protocol in the memory system not satisfying a dependency requirement for each of the first subset of DXE drivers that is provided by a dummy protocol identifier included in a dependency section of each of the first subset of DXE drivers; provide a second subset of DXE drivers, which are required for both the first initialization implementation and the second initialization implementation and that each do not include the dummy protocol identifier in the dependency section of that DXE driver, in the memory system; and perform the initialization process using the second subset of DXE drivers.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
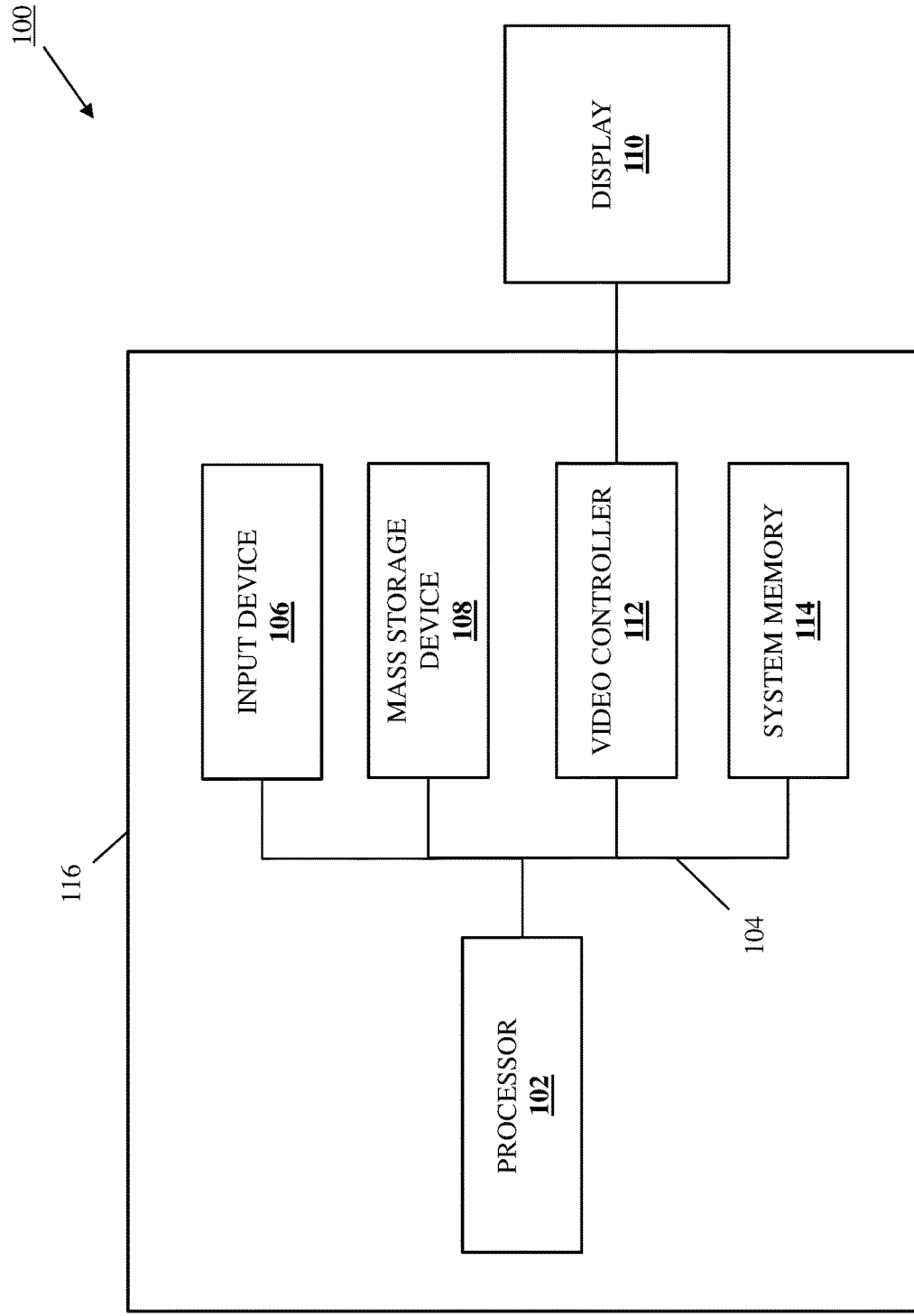
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
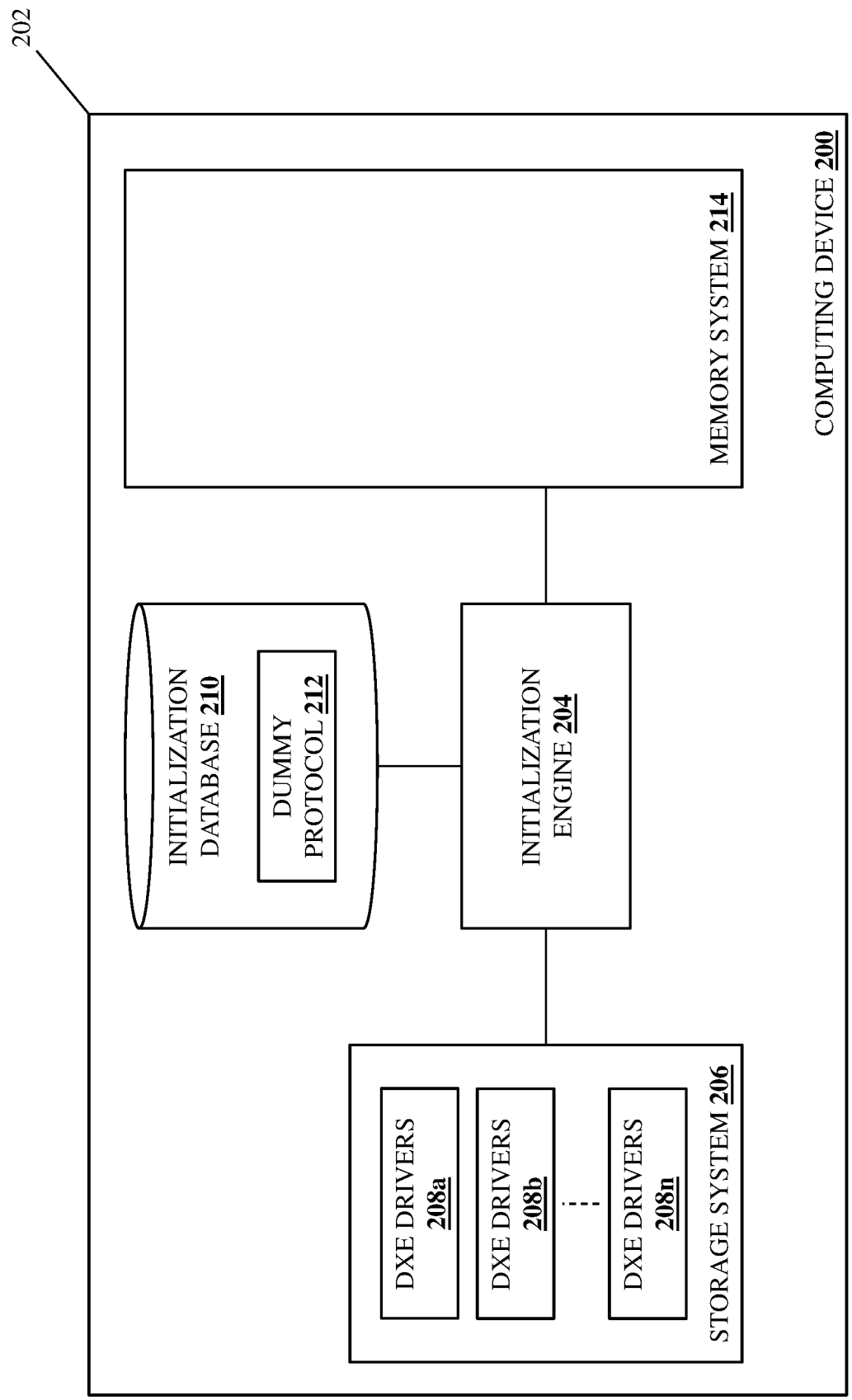
FIG. 2 is a schematic view illustrating an embodiment of a computing device that may include the multi-initialization implementation DXE driver loading system of the present disclosure.

Referring now to FIG. 2, an embodiment of a computing device 200 is illustrated that may include the multi-initialization implementation DXE driver loading system of the present disclosure. In an embodiment, the computing device 200 may be provided by the IHS 100 discussed above with reference to FIG. 1 and/or may include some or all of the components of the IHS 100, and in specific examples may be provided by server devices, networking devices (e.g., switch devices, router devices, etc.), storage systems, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and discussed below.

For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an initialization engine 204 that is configured to perform the functionality of the initialization engines and/or computing devices discussed below. To provide a specific example, the initialization engine 204 may be provided by firmware that includes a UEFI initialization engine with a DXE dispatcher that performs many of the operations described below, but that may also include a variety of other UEFI initialization components that would be apparent to one of skill in the art in possession of the present disclosure. Furthermore, while illustrated and described as a UEFI initialization engine, one of skill in the art in possession of the present disclosure will appreciate how the initialization engine 204 may be provided by other initialization systems while remaining within the scope of the present disclosure as well.

The chassis 202 may also house a storage system 206 that is coupled to the initialization engine 204 (e.g., via a coupling between the storage system 206 and the processing system). In specific examples, the storage system 206 may be provided by a Serial Peripheral Interface (SPI) storage device that may be included in a SPI-based flash chip (e.g., a Basic Input/Output System (BIOS) SPI chip), although one of skill in the art in possession of the present disclosure will appreciate how other storage systems will fall within the scope of the present disclosure as well. As illustrated, the storage system 206 may include firmware volumes that store a plurality of DXE drivers 208a, 208b, and up to 208n, which one of skill in the art in possession of the present disclosure will appreciate may be provided by hardware device drivers that are compliant with execution environments defined in the UEFI specification. However, while described as being provided by particular drivers, one of skill in the art in possession of the present disclosure will appreciate how the storage system 206 may store other drivers that are utilized similarly as the DXE drivers 208a-208n discussed below while remaining within the scope of the present disclosure as well.

As discussed in the specific examples described in further detail below, the plurality of DXE drivers 208a-208n may include a first subset of DXE drivers that are required for a first initialization implementation that may be configured on the computing device 200 but that are not required for a second initialization implementation that may be configured on the computing device 200, and a second subset of DXE drivers that are required for both the first initialization implementation and the second initialization implementation that may be configured on the computing device 200. However, while the plurality of DXE drivers 208a-208n are described as being required for either or both of the first initialization implementation and the second initialization implementation discussed below, one of skill in the art in possession of the present disclosure will appreciate how the storage system 206 may store other subsets of the DXE drivers 208a-208n that may be required for other initializations implementations that may be configured on the computing device 200 (e.g., a third initialization implementation, a fourth initialization implementation, and so on) while remaining within the scope of the present disclosure as well.

Furthermore, one of skill in the art in possession of the present disclosure will appreciate how, in the two-initialization-implementation embodiments of the present disclosure discussed below, the plurality of DXE drivers 208a-208n may be limited to the first and second subsets of DXE drivers that are required for either or both of the first initialization implementation and the second initialization implementation in order to, for example, conserve storage space in the storage system 206. However, two-initialization-implementation embodiments (or other multi-initialization-implementation embodiments) in which the plurality of DXE drivers 208a-208n include DXE drivers that are not required for either of the first initialization implementation and the second initialization implementation (i.e., unused DXE drivers are stored in the storage system 206) will fall within the scope of the present disclosure as well.

In the illustrated embodiment, the initialization engine 204 is coupled to an initialization database 210 that is illustrated as storing a dummy protocol 212, and one of skill in the art in possession of the present disclosure will appreciate how the initialization database 210 may be configured to store any of the information utilized by the initialization engine 204 discussed below. In a specific example, the initialization database 210 may be included in the firmware that provides the initialization engine 204, but one of skill in the art in possession of the present disclosure will appreciate how the initialization database 210 (and/or the dummy protocol 212) may be stored on any storage element accessible to the initialization engine 204 while remaining within the scope of the present disclosure as well. As discussed in further detail below, the dummy protocol 212 is utilized in the multi-initialization implementation DXE driver loading system of the present disclosure to control which of the plurality of DXE drivers 208a-208n are provided for use in an initialization process for the computing device 200 based on which of multiple initialization implementations are enabled on the computing device 200, and is referred to as a "dummy" protocol because it is not used like conventional protocols that are "published" or otherwise provided by one or more of the DXE drivers 208a-208n during the initialization process for the computing device 200.

To provide a specific example, the dummy protocol 212 may be configured to simply publish its own dummy protocol identifier (e.g., a Globally Unique IDentifier (GUID)) as part of the performance of its entry point function when the dummy protocol 212 is called/enabled in the computing device 200, and may be considered a "dummy" protocol due to that being the only task that is performed via calling/enablement of the dummy protocol 212. However, while a specific example of a dummy protocol is described, one of skill in the art in possession of the present disclosure will appreciate how the dummy protocol 212 may be configured to perform other functionality (e.g., providing logic to register/publish its GUID dynamically, displaying debug information for users, displaying board management solutions, etc.) will fall within the scope of the present disclosure as well.

As illustrated, the chassis 202 may also house a memory system 214 that is coupled to the initialization engine 204 (e.g., via a coupling between the memory system 214 and the processing system) and that, as discussed below, is configured to store DXE drivers for use in the initialization process for the computing device 200. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the multi-initialization implementation DXE driver loading functionality discussed below, while remaining within the scope of the present disclosure as well.

Figure 3A:
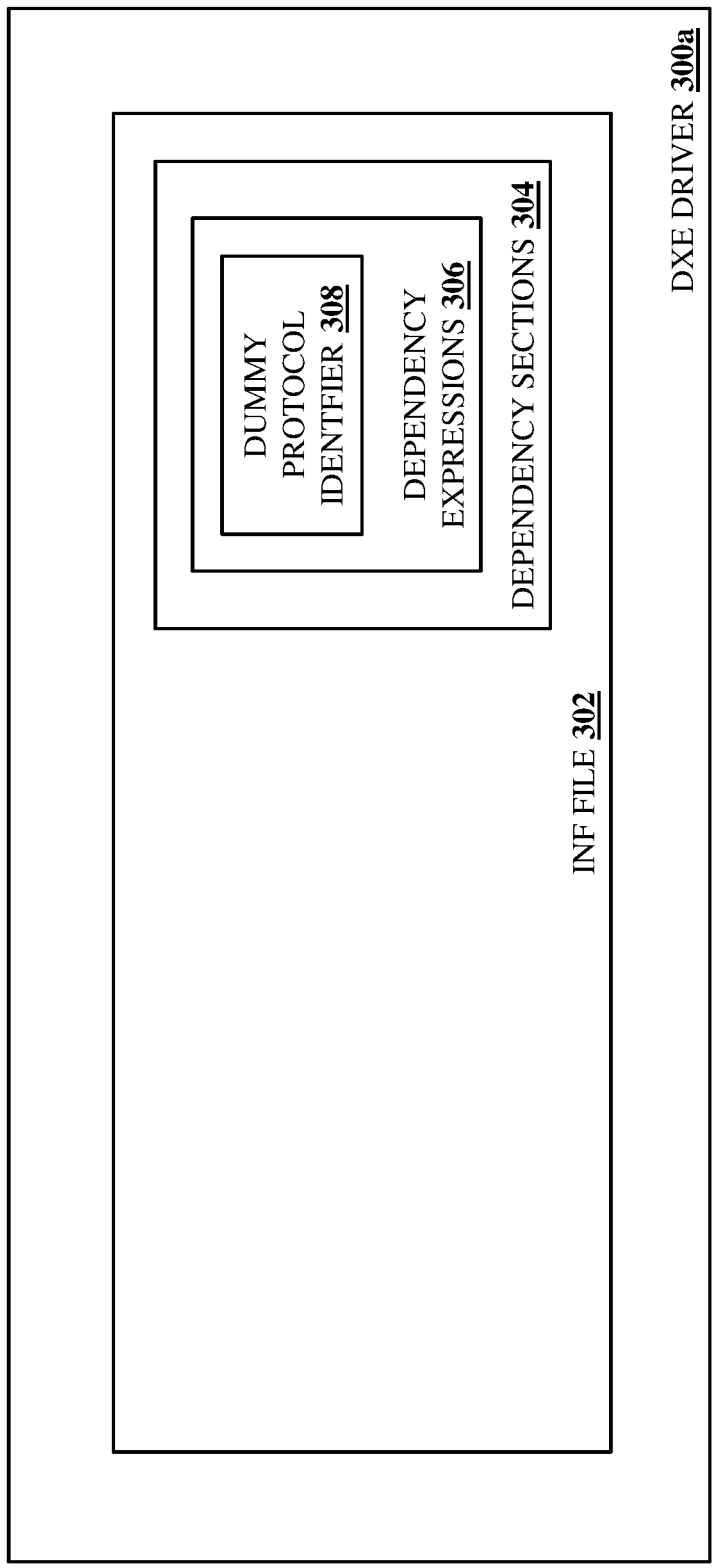
FIG. 3A is a schematic view illustrating an embodiment of a DXE driver that may be provided in the multi-initialization implementation DXE driver loading system of the present disclosure.
Figure 3B:
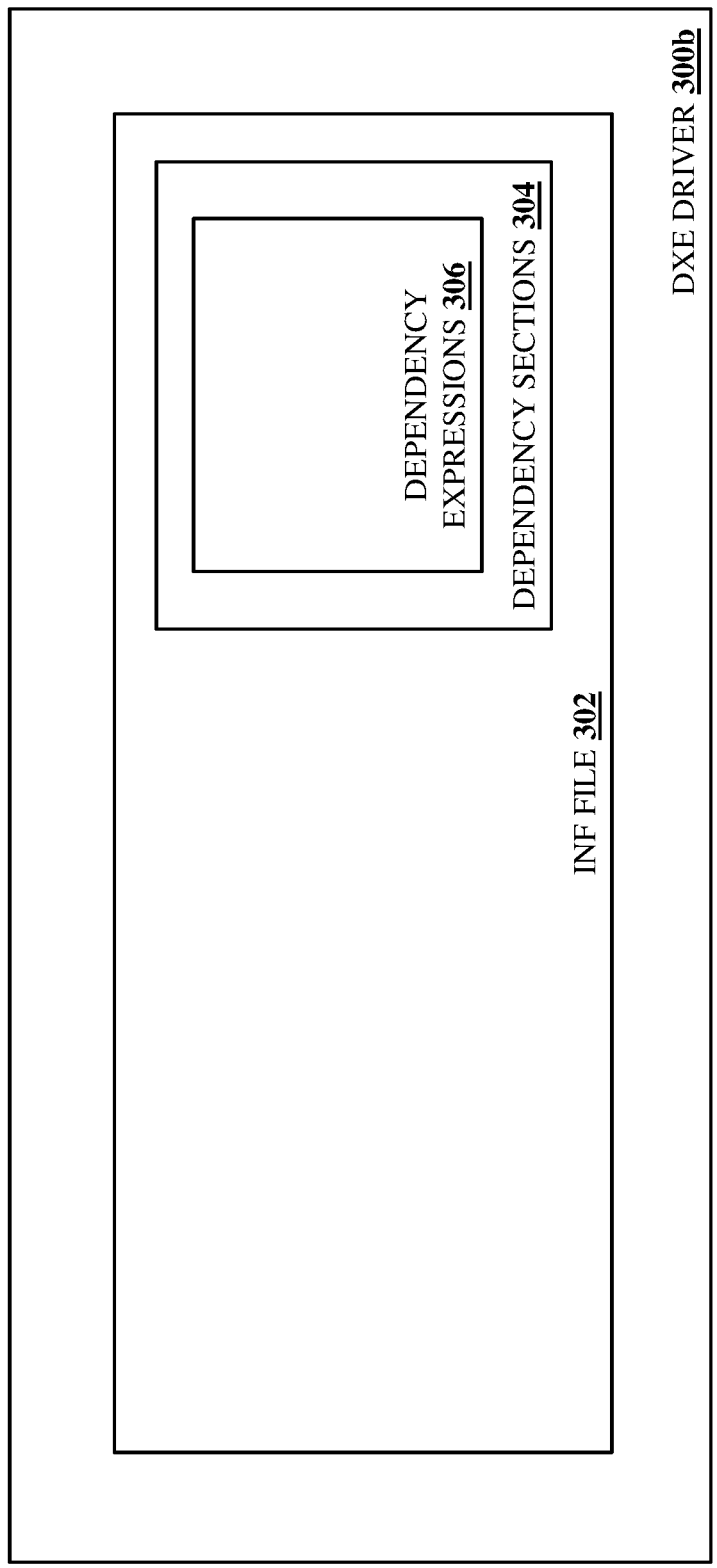
FIG. 3B is a schematic view illustrating an embodiment of a DXE driver that may be provided in the multi-initialization implementation DXE driver loading system of the present disclosure.

Referring now to FIGS. 3A and 3B, embodiments of DXE drivers 300a and 300b are illustrated that may provide any of the DXE drivers 208a-208n discussed above with reference to FIG. 2. As illustrated in FIGS. 3A and 3B, the DXE drivers 300a and 300b may each include a setup INFormation (INF) file 302 that one of skill in the art in possession of the present disclosure will appreciate may be provided by a text file in the DXE driver 300a/300b that includes information used to install the DXE driver 300a/300b on a hardware device in the computing device 200, hardware-device-specific configurations and/or settings that allow the hardware device to operate, and/or other INF file information that would be apparent to one of skill in the art in possession of the present disclosure. Furthermore, FIGS. 3A and 3B illustrated how the INF file 302 may include dependency sections 304 that may include dependency expressions 306. For example, as will be appreciated by one of skill in the art in possession of the present disclosure, DXE drivers may be dependent on other DXE drivers (e.g., a second DXE driver may be dependent on a protocol that is published or otherwise provided by a first DXE driver), and those dependencies may be identified by the dependency expressions 306 in the dependency sections 304 included in the INF file 302 of the DXE drivers 300a/300b.

As will be appreciated by one of skill in the art in possession of the present disclosure, the dependency expressions in the dependency sections included in the INF file of DXE drivers are conventionally used by a DXE dispatcher to determine an order in which to provide those DXE drivers in a memory system of its computing device, which allows DXE drivers to be loaded in an order that ensures that a first DXE driver dependent on a protocol published by a second DXE driver will be executed after that second DXE driver to ensure the protocol published by the second DXE driver is available for use by the first DXE driver. However, the inventors of the present disclosure have discovered that the dependency requirements of DXE drivers may be leveraged with a dummy protocol to control which DXE drivers are provided in the memory system of a computing device for use in an initialization process for that computing device based on which of multiple initialization implementations are enabled on that computing device. In order to do so, a computing device manufacturer (or other entity) may identify a first subset of DXE drivers that are required for a first initialization implementation that may be configured on the computing device 200 but that not required for a second initialization implementation that may be configured on the computing device 200, and a second subset of DXE drivers that are required for both the first initialization implementation and the second initialization implementation that may be configured on the computing device 200.

To provide a specific example, the first initialization implementation may be a UEFI implementation, while the second initialization implementation may be a non-UEFI implementation such as a "LINUXBOOT®" implementation, although other initialization implementations are envisioned as falling within the scope of the present disclosure as well. As will be appreciated by one of skill in the art in possession of the present disclosure, the UEFI implementation discussed above may require the plurality of DXE drivers 208a-208n discussed above with reference to FIG. 2, while the "LINUXBOOT®" implementation discussed above may only require a subset of the DXE drivers 208a-208n (e.g., the DXE drivers 208a, 208d, 208f, and 208h in the specific example provided below). As such, a first subset of the DXE drivers (e.g., the DXE drivers 208b, 208c, 208e, 208g, 208i, 208j, 208k, 208l, 208m, and 208n in the specific example provided below) may be identified as required for the UEFI implementation but not the "LINUXBOOT®" implementation, while a second subset of the DXE drivers (e.g., the DXE drivers 208a, 208d, 208f, and 208h in the specific example provided below) may be identified as required for both the UEFI implementation and the "LINUXBOOT®" implementation.

Continuing with this specific example, FIG. 3A illustrates how the DXE driver 300a, which may provide any of the first subset of the DXE drivers (e.g., the DXE drivers 208b, 208c, 208e, 208g, 208i, 208j, 208k, 208l, 208m, and 208n in the specific example provided below), may be provided with a dummy protocol identifier 308 (e.g., a dummy protocol Globally Unique IDentifier (GUID)) that identifies the dummy protocol 212 discussed above with reference to FIG. 2. Furthermore, FIG. 3B illustrates how the DXE driver 300b, which may provide any of the second subset of the DXE drivers (e.g., the DXE drivers 208a, 208d, 208f, and 208h in the specific example provided below), may not be provided with the dummy protocol identifier 308 that identifies the dummy protocol 212 discussed above with reference to FIG. 2. However, while specific embodiments of DXE drivers have been illustrated and described, one of skill in the art in possession of the present disclosure will appreciate how the DXE drivers of the present disclosure may be configured to enable the functionality described herein using other techniques that will fall within the scope of the present disclosure as well.

Figure 4:
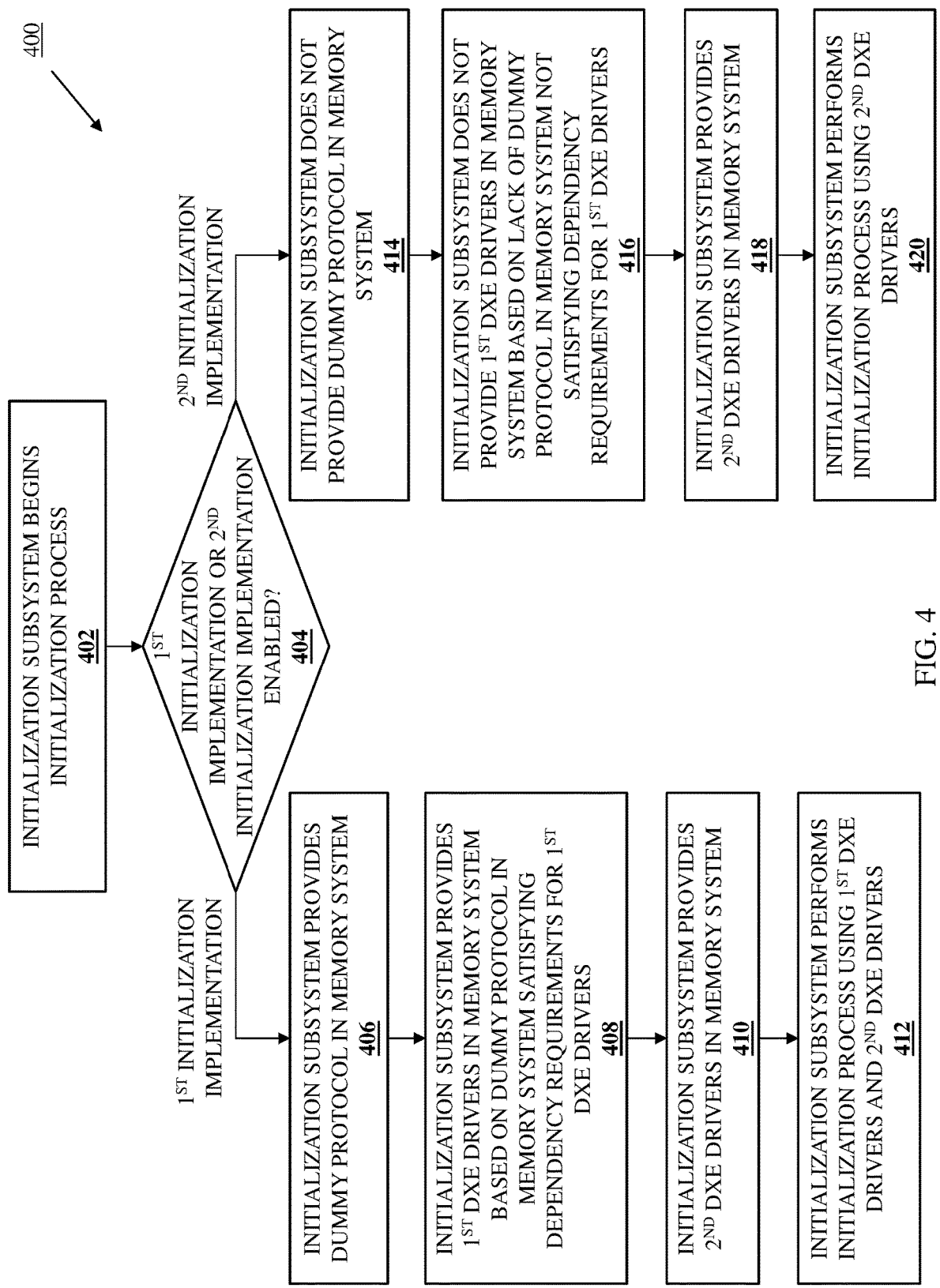
FIG. 4 is a flow chart illustrating an embodiment of a method for loading DXE drivers in a multi-initialization implementation computing device.

Referring now to FIG. 4, an embodiment of a method 400 for loading Driver execution Environment (DXE) drivers in a multi-initialization implementation computing device is illustrated. As discussed below, the systems and methods of the present disclosure utilize a dummy protocol to control which of the plurality of DXE drivers are provided for use in an initialization process for a computing device based on which of multiple initialization implementations are enabled on that computing device. For example, the multi-initialization implementation DXE driver loading system of the present disclosure may include a chassis housing an initialization subsystem coupled to a memory system and a storage system. The storage system stores first DXE driver(s) required for a first initialization implementation but not a second initialization implementation and each including a dummy protocol identifier identifying a dummy protocol in its dependency section, and second DXE driver(s) required for both the first and second initialization implementations and each not including the dummy protocol identifier in its dependency section. If the second initialization implementation is enabled, the initialization subsystem does not provide the dummy protocol in the memory system, which prevents it from providing the first DXE driver(s) in the memory system due to a dependency requirement provided by the dummy protocol identifier in their dependency sections not being satisfied, while providing the second DXE driver(s) in the memory system for use in performing an initialization process. As such, enhanced security, initialization time reductions, and/or other benefits of particular initialization implementations that result from the limited loading of a subset of the DXE drivers available in multi-initialization-implementation computing devices may be realized.

The method 400 begins at block 402 where an initialization subsystem begins an initialization process. In an embodiment, at block 402, the computing device 200 may be powered on, reset, and/or otherwise initialized such that the initialization engine 204 in the computing device 200 begins an initialization process (e.g., a Power On Self-Test (POST)). In the specific examples described below, the computing device 200 is describes as a dual-initialization implementation computing device that is configurable with either a UEFI implementation or a "LINUXBOOT®" implementation, and the initialization process may begin at block 402 with the UEFI initialization process (e.g., a "UEFI boot") discussed above that includes the SEC phase that may provide for execution of CPU initialization code (e.g., from the cold boot entry point) that sets up the computing device 200 to find, validate, and run PEI phase in the UEFI initialization process, with the PEI phase providing for the configuration of the computing device 200 and the loading and booting of a DXE phase in the UEFI initialization process. However, while a specific UEFI initialization process utilized in the multi-initialization implementation DXE driver loading system of the present disclosure has been described, one of skill in the art in possession of the present disclosure will appreciate how the teachings of the present disclosure may be extended to the PEI phase of the UEFI initialization process (e.g., using a PEI phase dummy driver that operates similar to the dummy protocol described herein) while remaining within the scope of the present disclosure as well.

However, as discussed below, the DXE phase in the UEFI initialization process discussed above that provides for the loading of DXE drivers that are used to configure hardware devices in the computing device 200 (and in some cases to mount storage devices, find/execute boot code, and/or perform other DXE driver operations known in the art) is modified during the method 300 relative to the conventional UEFI initialization process DXE phase. Furthermore, while the beginning of a specific initialization process for the computing device 200 has been described, one of skill in the art in possession of the present disclosure will appreciate how the initialization process may begin at block 302 with other initialization operations while remaining within the scope of the present disclosure as well. Furthermore, one of skill in the art in possession of the present disclosure will appreciate how additional initialization implementations other than the UEFI and non-UEFI implementations provided in the specific examples below may be available in the computing device 200 to provide a multi-initialization implementation computing device. Further still, non-UEFI implementations other than the "LINUXBOOT®" implementation described herein may be available in the computing device 200, and some embodiments may provide first and second initialization implementations that are both non-UEFI implementations while remaining within the scope of the present disclosure as well.

The method 400 then proceeds to decision block 404 where it is determined whether a first initialization implementation or a second initialization implementation is enabled. In an embodiment, at decision block 404, the initialization engine 204 in the computing device 200 may determine an initialization implementation that is enabled for the computing device 200. Continuing with the specific example provided above, at decision block 404, the initialization engine 204 may determine whether the UEFI implementation or the "LINUXBOOT®" implementation is enabled on the computing device 200. For example, the computing device 200 may include a Baseboard Management Controller (BMC) device (not illustrated) such as, for example, the integrated DELL® Remote Access Controller (iDRAC) available in computing devices provided by DELL® Inc. of Round Rock, Texas, United States, and initialization implementation flag(s) may be set in the BMC device to identify an initialization implementation enabled for the computing device 200 (e.g., with no flag indicating the UEFI implementation, and a flag indicating the "LINUXBOOT®" implementation). As such, during the initialization process, the initialization engine 204 may access the BMC device in the computing device 200 to determine the initialization implementation that is enabled for the computing device 200.

In another example, the initialization implementation enabled on the computing device 200 may be identified in a "personality" module in the computing device 200 such as an Outside Equipment Manufacturer IDentity (OEM-ID) module available in computing devices provided by DELL® Inc. of Round Rock, Texas, United States, which one of skill in the art in possession of the present disclosure will recognize may be configured to enable an OEM to customize the computing device 200 by enabling a particular initialization implementation for the computing device 200, and may identify that initialization implementation to the initialization engine 204 during initialization process. As such, during the initialization process, the initialization engine 204 may access the OEM-ID module in the computing device 200 to determine the initialization implementation enabled for the computing device 200. However, while a few specific techniques for determining an initialization implementation enabled on the computing device 200 have been described, one of skill in the art in possession of the present disclosure will appreciate how other techniques for determining the initialization implementation enabled on the computing device 200 at decision block 404 will fall within the scope of the present disclosure as well.

Figure 5A:
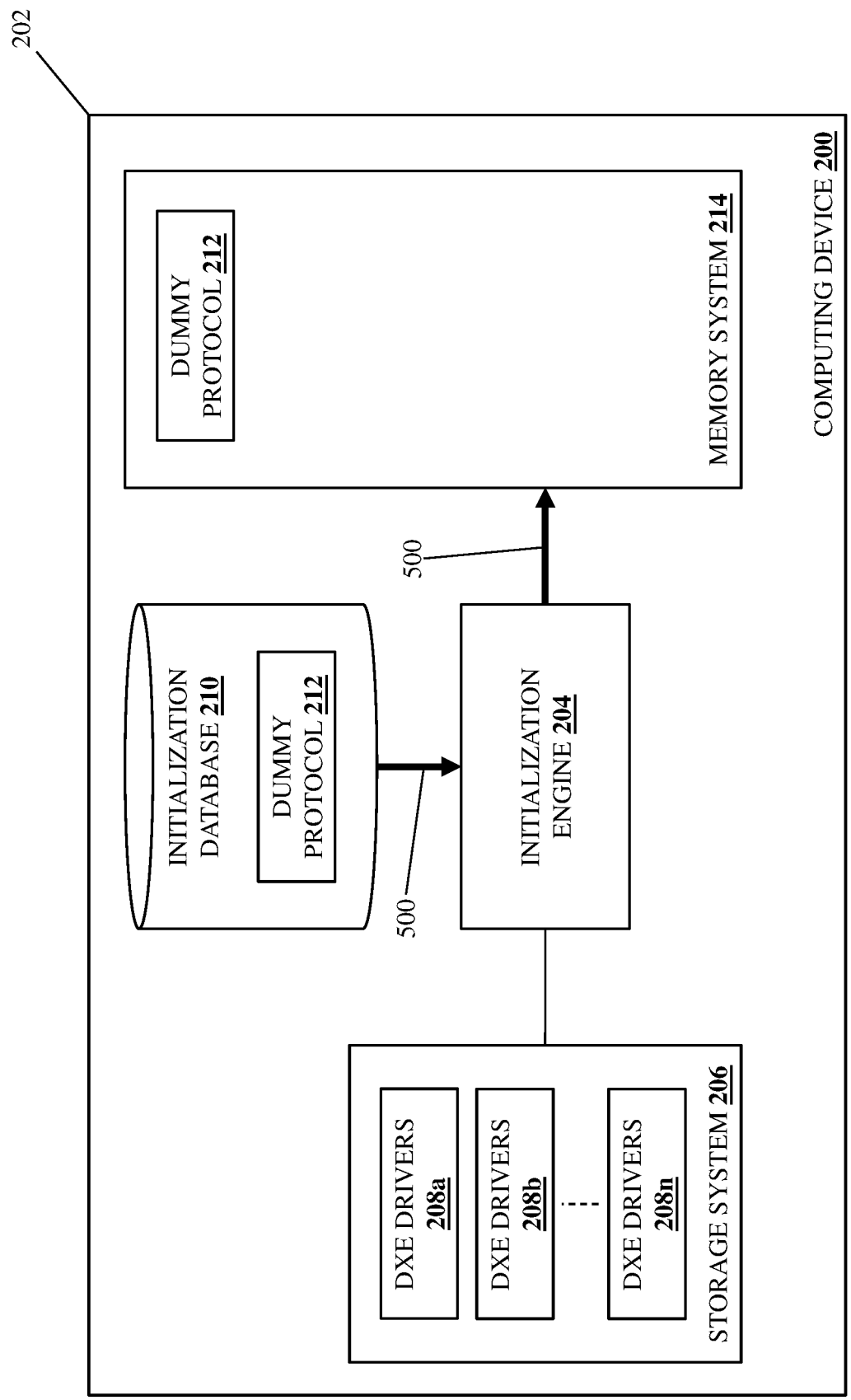
FIG. 5A is a schematic view illustrating an embodiment of the operation of the computing device of FIG. 2 during the method of FIG. 4.

If, at decision block 404, it is determined that the first initialization implementation is enabled, the method 400 proceeds to block 406 where the initialization subsystem provides a dummy protocol in a memory system. With reference to FIG. 5A, in an embodiment of block 406 and in response to determining that the first initialization implementation is enabled for the computing device 200 at decision block 404, the initialization engine 204 in the computing device 200 may perform dummy protocol provisioning operations 500 that may include retrieving the dummy protocol 212 from the initialization database 210, and loading or otherwise providing that dummy protocol 212 in the memory system 214. As such, continuing with the specific example provided above, in response to determining that the UEFI implementation is enabled in the computing device 200 at decision block 404, the initialization engine 204 may begin the DXE phase in the UEFI initialization process by loading or otherwise providing the dummy protocol 212 in the memory system 214. However, while a specific example of the provisioning of the dummy protocol 212 in the memory system 214 has been described, one of skill in the art in possession of the present disclosure will appreciate that the dummy protocol 212 may be loaded or otherwise provisioned in the memory system 214 in other manners that will fall within the scope of the present disclosure as well.

Figure 5B:
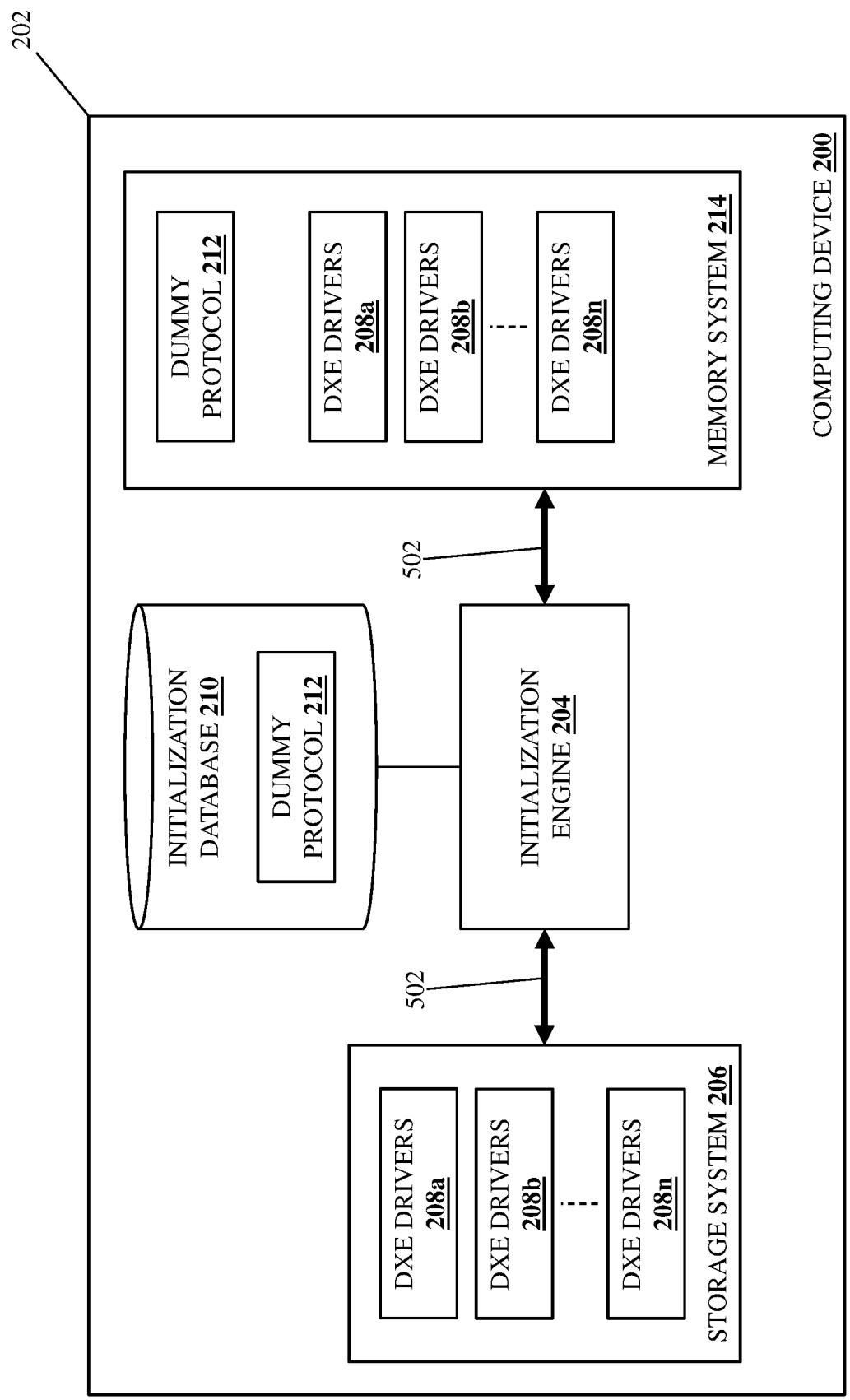
FIG. 5B is a schematic view illustrating an embodiment of the operation of the computing device of FIG. 2 during the method of FIG. 4.

The method 400 proceeds to block 408 where the initialization subsystem provides first DXE drivers in the memory system based on the dummy protocol in the memory system satisfying dependency requirements for the first DXE drivers. With reference to FIG. 5B, in an embodiment of block 408, the initialization engine 204 in the computing device 200 may perform DXE driver provisioning operations 502 that may include retrieving a first subset of the DXE drivers from the storage system 206 and loading or otherwise providing those DXE drivers in the memory system 214. As will be appreciated by one of skill in the art in possession of the present disclosure, in some embodiments blocks 408 and 410 of the method 400 may be performed at substantially the same time to retrieve at least some of the DXE drivers from the storage system 206 and load or otherwise provide those DXE drivers in the memory system 214.

Continuing with the specific example provided above, the first subset of the DXE drivers 208b, 208c, 208e, 208g, 208i, 208j, 208k, 208l, 208m, and 208n that are required for the UEFI implementation but not the "LINUXBOOT®" implementation will include the dummy protocol identifier 308 for the dummy protocol 212 in their dependency expressions 306 in the dependency sections 304 of their INF files 302 (e.g., as illustrated for the DXE driver 300a in the FIG. 3A). As will be appreciated by one of skill in the art in possession of the present disclosure, the loading/provisioning of the dummy protocol 212 in the memory system 214 at block 406 will cause the dependency requirements of the DXE drivers 208b, 208c, 208e, 208g, 208i, 208j, 208k, 208l, 208m, and 208n that are based on the dummy protocol identifier 308 to be satisfied at block 408, and allows for those DXE drivers 208b, 208c, 208e, 208g, 208i, 208j, 208k, 208l, 208m, and 208n to be loaded/provisioned in the memory system 214.

For example, at block 408, the initialization engine 204 may evaluate the dependency expressions 306 in the dependency sections 304 of the INF files 302 of any of the DXE drivers 208b, 208c, 208e, 208g, 208i, 208j, 208k, 208l, 208m, and 208n. In the event those dependency expressions 306 evaluate to "TRUE" or are otherwise satisfied (e.g., as with the dummy protocol identifier 308 being satisfied by the dummy protocol 212 provided in the memory system

214), that DEX driver may be promoted to a "scheduled" state such that it is loaded into the memory system 214 via a "LoadImage( )" operation.

The method 400 proceeds to block 410 where the initialization subsystem provides second DXE drivers in the memory system. With continued reference to FIG. 5B, in an embodiment of block 410, the DXE driver provisioning operations 502 performed by the initialization engine 204 in the computing device 200 may include retrieving a second subset of the DXE drivers from the storage system 206 and loading or otherwise providing those DXE drivers in the memory system 214. As discussed above, in some embodiments blocks 408 and 410 of the method 400 may be performed at substantially the same time to retrieve at least some of the DXE drivers from the storage system 206 and load or otherwise provide those DXE drivers in the memory system 214.

Continuing with the specific example provided above, the second subset of the DXE drivers 208a, 208d, 208f, and 208h that are required for both the UEFI implementation and the "LINUXBOOT®" implementation will not include the dummy protocol identifier 308 for the dummy protocol 212 in their dependency expressions 306 in the dependency sections 304 of their INF files 302 (e.g., as illustrated for the DXE driver 300b in the FIG. 3B). As will be appreciated by one of skill in the art in possession of the present disclosure, at blocks 408 and 410 of the method 400 the initialization engine 204 in the computing device 200 may utilize the dependency expressions 306 (e.g., other than the dummy protocol identifier 308) in the dependency sections 304 of the INF file(s) 302 in one or more of the DXE drivers 208a-208n to load or otherwise provision those DXE drivers 208a-208n in the memory system 214 in an order that satisfies the dependency requirements of each of those DXE drivers 208a-208n, with the DXE drivers 208b, 208c, 208e, 208g, 208i, 208j, 208k, 208l, 208m, and 208n available for loading/provisioning in the memory system 214 due to their dependency requirement that is based on the dummy protocol identifier 308 being satisfied by the loading/provisioning of the dummy protocol 212 in the memory system 214 at block 406.

As such, while the specific example in FIG. 5B illustrates all of the DXE drivers 208a-208n loaded or otherwise provisioned in the memory system 214 at blocks 408 and 410 in order (e.g., 208a, 208b, and up to 208n), one of skill in the art in possession of the present disclosure will appreciate how the DXE drivers 208a-208n may be loaded/ provisioned in the memory system 214 in any order that satisfies the dependency requirements of those DXE drivers 208a-208n defined by the dependency expressions 306 in the dependency sections 304 of their INF file(s) 302. Furthermore, as discussed above, while all of the DXE drivers 208a-208n stored in the storage system 206 are illustrated and described as being loaded/provisioning in the memory system 214 for the UEFI implementation (e.g., to provide for efficient use of the storage space in the storage system 206), embodiments in which some DXE drivers stored in the storage system 206 are not loaded/provisioned in the memory system 214 for the UEFI implementation (e.g., unused DXE drivers are stored in the storage system 206) will fall within the scope of the present disclosure as well.

The method 400 then proceeds to block 412 where the initialization subsystem performs the initialization process using the first DXE drivers and the second DXE drivers. In an embodiment, at block 412, the initialization engine 204 in the computing device 200 may then perform the initialization process using the DXE drivers that were loaded or otherwise provided in the memory system 214. Continuing with the specific example provided above, at block 412 the initialization engine 204 may utilize the DXE drivers 208a-208n that were loaded or otherwise provided in the memory system 214 to perform the initialization process that began at block 402, which one of skill in the art in possession of the present disclosure will appreciate continues the UEFI initialization process as part of the UEFI implementation enabled on the computing device 200 until that UEFI initialization process completes by loading an operating system for the computing device 200 and entering a runtime state of the computing device 200 in which the computing device 200 is controlled by the operating system.

If, at decision block 404, it is determined that the second initialization implementation is enabled, the method 400 proceeds to block 414 where the initialization subsystem does not provide the dummy protocol in a memory system. In an embodiment, at block 414 and in response to determining that the second initialization implementation is enabled for the computing device 200 at decision block 404, the initialization engine 204 in the computing device 200 will not perform the dummy protocol provisioning operations 500 discussed above with reference to FIG. 5A such that the dummy protocol 212 is not retrieved from the initialization database 210 or provided in the memory system 214. As such, continuing with the specific example provided above, in response to determining that the "LINUXBOOT®" implementation is enabled in the computing device 200 at decision block 404, the initialization engine 204 may begin the DXE phase in the UEFI initialization process without loading or otherwise providing the dummy protocol 212 in the memory system 214.

The method 400 proceeds to block 416 where the initialization subsystem does not provide first DXE drivers in the memory system based on the lack of the dummy protocol in the memory system not satisfying dependency requirements for the first DXE drivers, and then to block 418 where the initialization subsystem provides second DXE drivers in the memory system. In an embodiment, at blocks 416 and 418, the initialization engine 204 in the computing device 200 may perform DXE driver provisioning operations 600 that may include retrieving a subset of the DXE drivers from the storage system 206 and loading or otherwise providing those DXE drivers in the memory system 214. As will be appreciated by one of skill in the art in possession of the present disclosure, blocks 416 and 418 of the method 400 may be performed at substantially the same time to retrieve at least some of the DXE drivers from the storage system 206 and load or otherwise provide those DXE drivers in the memory system 214.

Continuing with the specific example provided above, the first subset of the DXE drivers 208b, 208c, 208e, 208g, 208i, 208j, 208k, 208l, 208m, and 208n that are required for the UEFI implementation but not the "LINUXBOOT®" implementation will include the dummy protocol identifier 308 for the dummy protocol 212 in their dependency expressions 306 in the dependency sections 304 of their INF files 302 (e.g., as illustrated for the DXE driver 300a in the FIG. 3A). As will be appreciated by one of skill in the art in possession of the present disclosure, the lack of the loading/provisioning of the dummy protocol 212 in the memory system 214 at block 414 will prevent the dependency requirements of the DXE drivers 208b, 208c, 208e, 208g, 208i, 208j, 208k, 208l, 208m, and 208n that are based on the dummy protocol identifier 308 from being satisfied at block 416, and prevents those DXE drivers 208b, 208c, 208e, 208g, 208i, 208j, 208k, 208*l*, 208*m*, and 208*n* from being loaded/provisioned in the memory system 214 at block 416.

For example, at block 416, the initialization engine 204 may evaluate the dependency expressions 306 in the dependency sections 304 of the INF files 302 of any of the DXE drivers 208*b*, 208*c*, 208*e*, 208*g*, 208*i*, 208*j*, 208*k*, 208*l*, 208*m*, and 208*n*. In the event those dependency expressions 306 evaluate to "FALSE" or are otherwise not satisfied (e.g., as with the dummy protocol identifier 308 not being satisfied by the lack of the dummy protocol 212 in the memory system 214), that DXE driver will not be promoted from its "dependent" state, thus preventing the DXE drivers 208*b*, 208*c*, 208*e*, 208*g*, 208*i*, 208*j*, 208*k*, 208*l*, 208*m*, and 208*n* that are not required for the "LINUXBOOT®" implementation from being loaded/provisioned in the memory system 214.

Continuing with the specific example provided above, the second subset of the DXE drivers 208*a*, 208*d*, 208*f*, and 208*h* that are required for both the UEFI implementation and the "LINUXBOOT®" implementation will not include the dummy protocol identifier 308 for the dummy protocol 212 in their dependency expressions 306 in the dependency sections 304 of their INF files 302 (e.g., as illustrated for the DXE driver 300*b* in the FIG. 3B). As will be appreciated by one of skill in the art in possession of the present disclosure, at block 418 of the method 400 the initialization engine 204 in the computing device 200 may utilize the dependency expressions 306 (e.g., other than the dummy protocol identifier 308) in the dependency sections 304 of the INF file(s) 302 in one or more of the DXE drivers 208*a*, 208*d*, 208*f*, and 208*h* to load or otherwise provision those DXE drivers 208*a*, 208*d*, 208*f*, and 208*h* in the memory system 214 in an order that satisfies the dependency requirements of each of those DXE drivers 208*a*, 208*d*, 208*f*, and 208*h*, with the DXE drivers 208*b*, 208*c*, 208*e*, 208*g*, 208*i*, 208*j*, 208*k*, 208*l*, 208*m*, and 208*n* not available for loading/provisioning in the memory system 214 due to their dependency requirement that is based on the dummy protocol identifier 308 not being satisfied by the lack of the loading/provisioning of the dummy protocol 212 in the memory system 214 at block 406.

Figure 6:
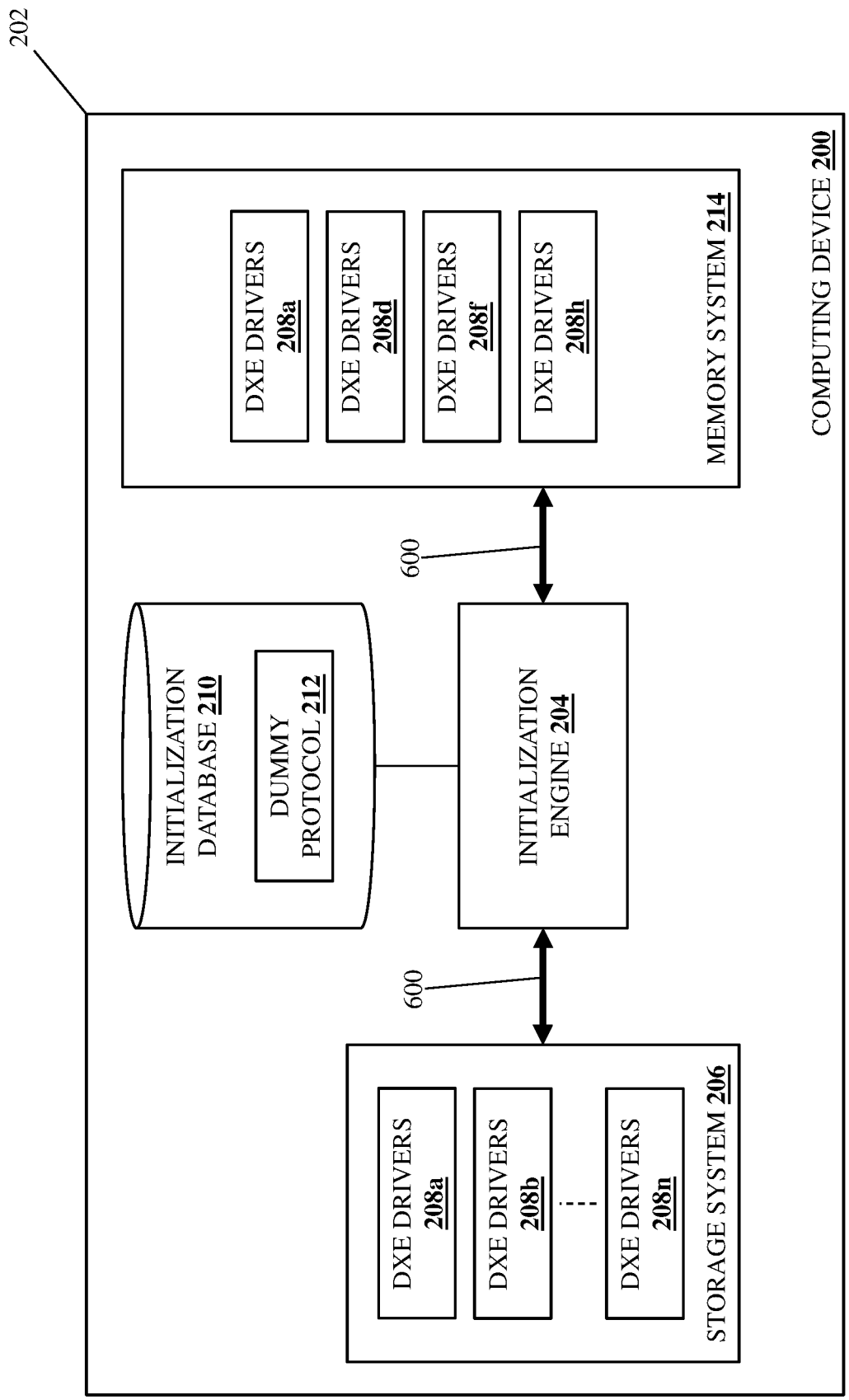
FIG. 6 is a schematic view illustrating an embodiment of the operation of the computing device of FIG. 2 during the method of FIG. 4.

As such, while the specific example in FIG. 6 illustrates the DXE drivers 208*a*, 208*d*, 208*f*, and 208*h* loaded or otherwise provisioned in the memory system 214 at block 418 in order (e.g., 208*a*, 208*d*, 208*f*, and 208*h*), one of skill in the art in possession of the present disclosure will appreciate how the DXE drivers 208*a*, 208*d*, 208*f*, and 208*h* may be loaded/provisioned in the memory system 214 in any order that satisfies the dependency requirements of those DXE drivers 208*a*, 208*d*, 208*f*, and 208*h* defined by the dependency expressions 306 in the dependency sections 304 of their INF file(s) 302.

The method 400 proceeds to block 420 where the initialization subsystem performs the initialization process using the second DXE drivers. In an embodiment, at block 420, the initialization engine 204 in the computing device 200 may then perform the initialization process using the DXE drivers that were loaded or otherwise provided in the memory system 214. Continuing with the specific example provided above, at block 412 the initialization engine 204 may utilize the DXE drivers 208*a*, 208*d*, 208*f*, and 208*h* that were loaded or otherwise provided in the memory system 214 to perform the initialization process that began at block 402, which one of skill in the art in possession of the present disclosure will appreciate performs the UEFI initialization process with a limited subset of the available DXE drivers as part of the "LINUXBOOT®" implementation enabled on the computing device 200 that may retrieve a "LINUXBOOT®" image from the storage system 206 (not illustrated), and then use that "LINUXBOOT®" image to load an operating system for the computing device 200 and enter a runtime state of the computing device 200 in which the computing device 200 is controlled by the operating system.

Thus, systems and methods have been described that utilize a dummy protocol to control which of the plurality of DXE drivers are provided for use in an initialization process for a computing device based on which of a UEFI implementation and a "LINUXBOOT®" implementation are enabled on that computing device. For example, the multi-initialization implementation DXE driver loading system of the present disclosure may include a chassis housing an initialization subsystem coupled to a memory system and a storage system. The storage system stores first DXE driver (s) required for a UEFI implementation but not a "LINUXBOOT®" implementation and each including a dummy protocol identifier identifying a dummy protocol in its dependency section, and second DXE driver(s) required for both the UEFI and "LINUXBOOT®" implementations and each not including the dummy protocol identifier in its dependency section. If the "LINUXBOOT®" implementation is enabled, the initialization subsystem does not provide the dummy protocol in the memory system, which prevents it from providing the first DXE driver(s) in the memory system due to a dependency requirement provided by the dummy protocol identifier in their dependency sections not being satisfied, while providing the second DXE driver(s) in the memory system for use in performing an initialization process. As such, enhanced security, initialization time reductions, and/or other benefits that result from the limited loading of a subset of the DXE drivers available in multi-initialization-implementation computing devices via the "LINUXBOOT®" implementation are realized without a need to build a custom BIOS to support the "LINUXBOOT®" implementation, or change fdf files and a firmware volume layout.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-initialization implementation Driver execution Environment (DXE) driver loading system, comprising:
  a chassis;
  a memory system that is housed in the chassis;
  a storage system that is housed in the chassis and that includes:
    a first subset of Driver execution Environment (DXE) drivers that are required for a first initialization implementation but not required for a second initialization implementation and that each include a dummy protocol identifier that identifies a dummy protocol in a dependency section of that DXE driver; and
    a second subset of the plurality of DXE drivers that are required for both the first initialization implementation and the second initialization implementation and that each include a DXE driver provisioning protocol identifier that identifies a DXE driver provisioning protocol in a dependency section of that DXE driver, and that do not include the dummy protocol identifier in the dependency section of that DXE driver; and
an initialization subsystem that is housed in the chassis, that is coupled to the memory system and the storage system, and that is configured to:
begin an initialization process;
determine whether the first initialization implementation or the second initialization implementation is enabled; and
if the second initialization implementation is enabled:
provide the DXE driver provisioning protocol in the memory system, wherein the dummy protocol is not provided in the memory system when the second initialization implementation is enabled;
provide the second subset of DXE drivers in the memory system based on the DXE driver provisioning protocol included in the memory system satisfying a dependency requirement for each of the second subset of DXE drivers that is provided by the DXE driver provisioning protocol identifier in the dependency section of each of the second subset of DXE drivers, wherein the first subset of DXE drivers are not provided in the memory system based on the dummy protocol not being provided in the memory system when the second initialization implementation is enabled such that a dependency requirement for each of the first subset of DXE drivers that is provided by the dummy protocol identifier in the dependency section of each of the first subset of DXE drivers is not satisfied;
and
perform the initialization process using the second subset of DXE drivers.

2. The system of claim 1, wherein the initialization subsystem is configured to:
if the first initialization implementation is enabled:
provide the DXE driver provisioning protocol and the dummy protocol in the memory system;
provide the first subset of DXE drivers in the memory system based on the dummy protocol included in the memory system satisfying the dependency requirement for each of the first subset of DXE drivers that is provided by the dummy protocol identifier in the dependency section of each of the first subset of DXE drivers;
provide the second subset of DXE drivers in the memory system based on the DXE driver provisioning protocol included in the memory system satisfying the dependency requirement for each of the second subset of DXE drivers that is provided by the DXE driver provisioning protocol identifier in the dependency section of each of the second subset of DXE drivers; and
perform the initialization process using the first subset of DXE drivers and the second subset of DXE drivers.

3. The system of claim 1, wherein the first initialization implementation is a Unified extensible Firmware Interface (UEFI) implementation.

4. The system of claim 1, wherein the second initialization implementation is a non-UEFI implementation.

5. The system of claim 4, wherein the non-UEFI implementation is a LINUXBOOT® implementation.

6. The system of claim 1, wherein the initialization subsystem is configured to:

provide the second subset of DXE drivers in the memory system in an order that is defined by at least one non-dummy protocol identifier included in the dependency section of at least one of the second subset of DXE drivers.

7. An Information Handling System (IHS), comprising:
a processing system; and
a memory system that is coupled to the processing system and that includes instructions that, when executed by the processing system, cause the processing system to provide an initialization engine that is configured to:
begin an initialization process;
determine whether a first initialization implementation or a second initialization implementation is enabled; and
if the second initialization implementation is enabled:
provide a Driver execution Environment (DXE) driver provisioning protocol in the memory system, wherein a dummy protocol is not provided in the memory system when the second initialization implementation is enabled;
provide a second subset of DXE drivers, which are required for the first initialization implementation but not required for the second initialization implementation and that each include a DXE driver provisioning protocol identifier in a dependency section of that DXE driver, in a memory system based on the DXE driver provisioning protocol included in the memory system satisfying a dependency requirement for each of the second subset of DXE drivers that is provided by the DXE driver provisioning protocol identifier included in the dependency section of each of the second subset of DXE drivers,
wherein a first subset of DXE drivers, which are required for both the first initialization implementation and the second initialization implementation and that each include a dummy protocol identifier in a dependency section of that DXE driver, are not provided in in the memory system based on the dummy protocol not being provided in the memory system when the second initialization implementation is enabled such that a dependency requirement for each of the first subset of DXE drivers that is provided by the dummy protocol identifier in the dependency section of each of the first subset of DXE drivers is not satisfied; and
perform the initialization process using the second subset of DXE drivers.

8. The IHS of claim 7, wherein the initialization engine is configured to:
if the first initialization implementation is enabled:
provide the DXE driver provisioning protocol and the dummy protocol in the memory system;
provide the first subset of DXE drivers in the memory system based on the dummy protocol included in the memory system satisfying the dependency requirement for each of the first subset of DXE drivers that is provided by the dummy protocol identifier in the dependency section of each of the first subset of DXE drivers;
provide the second subset of DXE drivers in the memory system based on the DXE driver provisioning protocol included in the memory system satisfying the dependency requirement for each of the second subset of DXE drivers that is provided by the DXE driver provisioning protocol identifier in the dependency section of each of the second subset of DXE drivers; and perform the initialization process using the first subset of DXE drivers and the second subset of DXE drivers.

9. The IHS of claim 8, wherein the initialization engine is configured to:

provide the first subset of DXE driver and the second subset of DXE drivers in the memory system in an order that is defined by at least one non-dummy protocol identifier included in the dependency section of at least one of the first subset of DXE driver and the second subset of DXE drivers in the memory system.

10. The IHS of claim 7, wherein the first initialization implementation is a Unified extensible Firmware Interface (UEFI) implementation.

11. The IHS of claim 7, wherein the second initialization implementation is a non-UEFI implementation.

12. The IHS of claim 11, wherein the non-UEFI implementation is a LINUXBOOT® implementation.

13. The IHS of claim 7, wherein the initialization engine is configured to:

provide the second subset of DXE drivers in the memory system in an order that is defined by at least one non-dummy protocol identifier included in the dependency section of at least one of the second subset of DXE drivers.

14. A method for loading Driver eXecution Environment (DXE) drivers in a multi-initialization implementation computing device, comprising:

beginning, by an initialization subsystem, an initialization process;

determining, by the initialization subsystem, whether a first initialization implementation or a second initialization implementation is enabled; and if the second initialization implementation is enabled:
providing, by the initialization subsystem, a Driver execution Environment (DXE) driver provisioning protocol in the memory system, wherein a dummy protocol is not provided in the memory system when the second initialization implementation is enabled;
providing, by the initialization subsystem, a second subset of DXE drivers, which are required for the first initialization implementation but not required for the second initialization implementation and that each include a DXE driver provisioning protocol identifier in a dependency section of that DXE driver, in a memory system based on the DXE driver provisioning protocol included in the memory system satisfying a dependency requirement for each of the second subset of DXE drivers that is provided by the DXE driver provisioning, protocol identifier included in the dependency section of each of the second subset of DXE drivers,
wherein a first subset of DXE drivers, which are required for both the first initialization implementation and the second initialization implementation and that each include a dummy protocol identifier in a dependency section of that DXE driver, are not provided in in the memory system based on the dummy protocol not being provided in the memory system when the second initialization implementation is enabled such that a dependency requirement for each of the first subset of DXE drivers that is provided by the dummy protocol identifier in the dependency section of each of the first subset of DXE drivers is not satisfied; and
performing, by the initialization subsystem, the initialization process using the second subset of DXE drivers.

15. The method of claim 14, further comprising:
if the first initialization implementation is enabled:
providing, by the initialization subsystem, the DXE driver provisioning protocol and the dummy protocol in the memory system;
providing, by the initialization subsystem, the first subset of DXE drivers in the memory system based on the dummy protocol included in the memory system satisfying the dependency requirement for each of the first subset of DXE drivers that is provided by the dummy protocol identifier in the dependency section of each of the first subset of DXE drivers;
providing, by the initialization subsystem, the second subset of DXE drivers in the memory system based on the DXE driver provisioning protocol included in the memory system satisfying the dependency requirement for each of the second subset of DXE drivers that is provided by the DXE driver provisioning protocol identifier in the dependency section of each of the second subset of DXE drivers; and
performing, by the initialization subsystem, the initialization process using the first subset of DXE drivers and the second subset of DXE drivers.

16. The method of claim 15, further comprising:
providing, by the initialization subsystem, the first subset of DXE driver and the second subset of DXE drivers in the memory system in an order that is defined by at least one non-dummy protocol identifier included in the dependency section of at least one of the first subset of DXE driver and the second subset of DXE drivers in the memory system.

17. The method of claim 14, wherein the first initialization implementation is a Unified extensible Firmware Interface (UEFI) implementation.

18. The method of claim 14, wherein the second initialization implementation is a non-UEFI implementation.

19. The method of claim 18, wherein the non-UEFI implementation is a LINUXBOOT® implementation.

20. The method of claim 14, further comprising:
providing, by the initialization subsystem, the second subset of DXE drivers in the memory system in an order that is defined by at least one non-dummy protocol identifier included in the dependency section of at least one of the second subset of DXE drivers.

* * * * *